United States Patent [19]

Clavel

[11] 4,307,660
[45] Dec. 29, 1981

[54] DEVICE FOR THE CRACKING OF SHELL FRUITS

[75] Inventor: Joseph Clavel, Grenoble, France

[73] Assignee: Machines et Produits Nouveaux, France

[21] Appl. No.: 100,277

[22] Filed: Dec. 5, 1979

[30] Foreign Application Priority Data

Dec. 7, 1978 [FR] France .................... 78 34544

[51] Int. Cl.³ ............................................. A23N 5/00
[52] U.S. Cl. ........................................ 99/574; 99/575; 99/579; 99/582
[58] Field of Search .......... 99/568, 523, 572, 574–576, 99/579, 581–583, 609, 617, 618, 621, 622, 628, 619, 623

[56] References Cited

U.S. PATENT DOCUMENTS

| | | | |
|---|---|---|---|
| 1,178,075 | 4/1916 | Huston | 99/575 |
| 1,591,251 | 7/1926 | Vaughan | 99/575 |
| 1,941,939 | 1/1934 | Hershey | 99/628 |
| 2,062,534 | 12/1936 | Thompson | 99/575 |
| 2,296,088 | 9/1942 | Carter | 99/579 |
| 2,765,830 | 10/1956 | Guenther | 99/572 |

Primary Examiner—Philip R. Coe
Assistant Examiner—Timothy F. Simone
Attorney, Agent, or Firm—Stevens, Davis, Miller & Mosher

[57] ABSTRACT

Machine for cracking shell fruit comprising a rotor (1) formed of two plates (2) and (3) and having cavities (4), the axes of the plates (2) and (3) being inclined so as to vary the overall size of the cavities (4), and furthermore comprising a feed device formed in particular of transfer tubes (19) and cups (20) mounted on a disk (18).

11 Claims, 4 Drawing Figures

DEVICE FOR THE CRACKING OF SHELL FRUITS

The present invention concerns a device intended to crack shell fruits, such as in particular walnuts, hazelnuts, almonds and coconuts.

A machine which makes it possible to crack nuts is at present known which comprises a drum from which the nuts are projected against a stationary wall. With such a machine it is very difficult to control the operation of cracking the nuts so that the meat which is contained within the shell is frequently severely damaged.

A machine is also known which makes it possible to open a nut in two parts by means of a saw. This machine has many drawbacks. In particular, only a single nut can be treated at a time and furthermore the meat contained within the shell is damaged.

The object of the present invention is to provide a machine intended to crack shell fruits which for all practical purposes does not damage the meat which is contained within the shell and which furthermore permits very high rates of handling of the shell fruits.

The machine in accordance with the invention comprises a rotor all around which fruit treatment stations are arranged. This rotor comprises a first plate and a second plate which turns with the first plate and is located at a distance from it.

The facing faces of the first plate and second plate have radial protrusions facing each other which produce cavities. These cavities are preferably identical, open at the periphery of the rotor and such that their sections decrease from the periphery of the rotor towards its center. These cavities determine the said fruit treatment stations.

In accordance with the present invention, the axes of the said plates are inclined with respect to each other so that alternately in the overall size of each cavity decreases and increases during the rotation of the rotor. Thus if a fruit is introduced into each cavity of the rotor during preferably the decrease in its overall size the shell of the fruit is broken. Furthermore, upon the increase in the overall size of the said cavity, the broken nut is freed.

Accordingly, the rotor of the present invention makes it possible to break the shell of one nut per cavity per revolution of the rotor although by increasing the diameter of the rotor one can increase the number of cavities and therefore increase the rate of treatment of the nut.

It may be pointed out in particular that the crushing of the fruit leading to the breaking of its shell is substantially proportional to the distance between the fruit and the axis of the rotor, the angle during which the fruit is crushed and the difference between the extreme overall sizes of the cavities, which difference is a function of the inclination of the axes of the plates with respect to each other.

In accordance with a preferred embodiment, the axis of the first plate is fixed and the inclination of the axis of the second plate with respect to the axis of the first plate is adjustable in order to modify the increases and decreases of the overall size of the said cavities. Thus it is possible to adapt the crushing of the fruits which it is desired to treat as a function of the result desired and the average size of the fruits treated, particularly if it is desired to preserve the interior of the fruit. This adjustment is particularly important since the crushing necessary to break the shell of a fruit varies in accordance with the varieties of one and the same fruit, the soil from which it has come and the year.

In accordance with one preferred embodiment, the second plate is connected to two radial levers which are arranged at an angle from each other in fixed angular position. One of the ends of each lever is connected to the second plate by means which permit said second plate to turn while maintaining the position of the levers fixed with respect to the general plane of the second plate. Furthermore, the other end of each lever is fastened to means which make it possible to adjust the inclination of the axis of the second plate with respect to the axis of the first plate by displacement of their other end, thus making it possible to regulate the increase and decrease of the overall size of the said cavities.

In one preferred embodiment of the invention, the second plate is mounted on a shaft which is connected to the first plate by a swivel joint the center of which is located substantially on the axis of the first plate, the said levers being connected to the said shaft by bearings or similar means.

The machine in accordance with the present invention furthermore comprises a fruit feeding device which assures the distribution by gravity of one fruit into each cavity of the rotor, the axis of the first plate of the rotor being preferably substantially horizontal.

In accordance with the present invention, the fruit feed device comprises a disk which forms a radial outward extension of the first plate. This disk bears on the same side as the cavities, that is to say on the side of the second plate, transfer tubes which are arranged radially to each treatment station. These transfer tubes comprise an inner opening opposite the corresponding cavity. The disk furthermore bears on its other side cups each of which communicates with the inside of the corresponding tube moves through orifices which pass through the disk.

In accordance with the present invention, the cups within a store of fruits which is defined in part by the lower portion of the disk and of the first plate.

In accordance with the present invention, the feed device furthermore comprises a fixed radial metal plate preferably in the form of a ring sector, which is adjacent the disk on the side of the cups. This plate serves to block the openings of the disk which are present in said store and is extended to at least the horizontal plane passing through the axis of the rotor in the direction of rotation of the latter. Another stationary metal plate makes it possible to block the said inner openings of the tubes at least over a portion of the periphery of the disk extending from the place where said radial plate stops up to the vicinity of the upper portion of the disk, in the direction of rotation of the latter.

In accordance with the present invention, the said plate which blocks the inner openings of the tubes is extended in order also to block the openings of the tubes present below the horizontal plane passing through the axis of the rotor.

The present invention will be better understood from the study of one embodiment of the machine of the present invention which is described by way of non-limitative example and illustrated in the drawings, in which.

Figure 1:
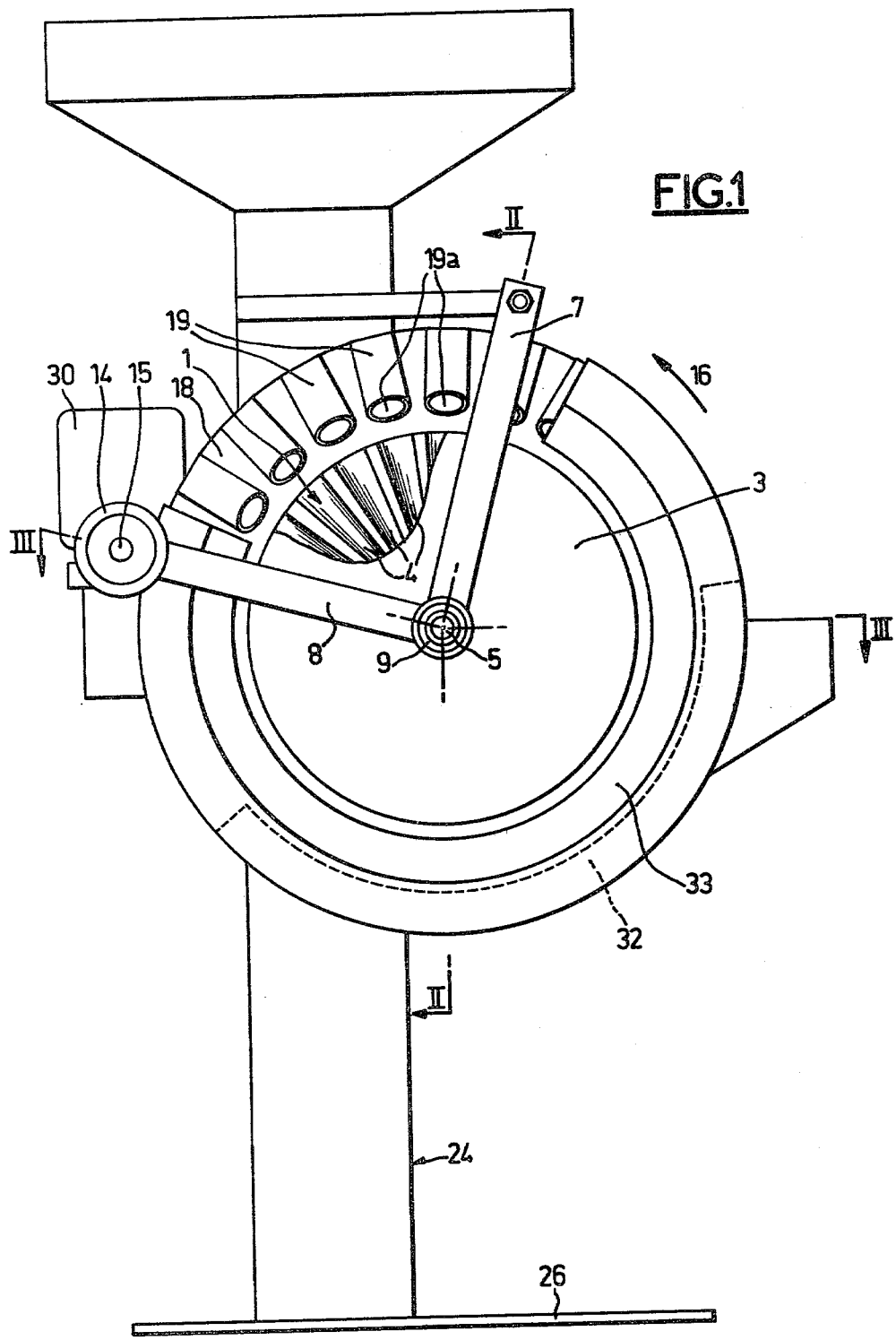
FIG. 1 is a front outside view of a machine in accordance with the present invention.

The machine intended to crack shell fruit which is shown in the figures comprises a rotor generally designated as 1.

The rotor 1 comprises a first plate 2 and a second plate 3, the axis of the plate 2 being substantially horizontal.

The plates 2 and 3 are spaced from each other and are connected in such a manner that they can turn at the same speed, for instance by spurs not shown in the drawing.

The facing faces of the plates 2 and 3 comprise the facing radial grooves 2a and 3a which are preferably identical. The grooves 2a and 3a define cavities 4 which are open at the periphery of the rotor 1, as can be noted more specifically from FIG. 3. The cavities 4 are substantially of cone shape with cross section decreasing from the periphery of the rotor 1 towards its center and are uniformly distributed over the periphery of the rotor.

The plate 3 is fastened on the shaft 5 which is connected to the plate 2 by a swivel joint 6 whose center is substantially identical with the axis of the plate 2 although the inclination of the axis of the plate 3 with respect to the axis of the plate 2 can be varied.

The shaft 5 is furthermore connected to two levers 7 and 8 via bearings 9.

The levers 7 and 8 in the example shown are substantially radial and spaced angularly, apart from each other by an angle of about 90°, the lever 7 being substantially vertical and directed upward and the lever 8 being substantially horizontal and directed towards the left, as can be noted from FIG. 1.

Figure 2:
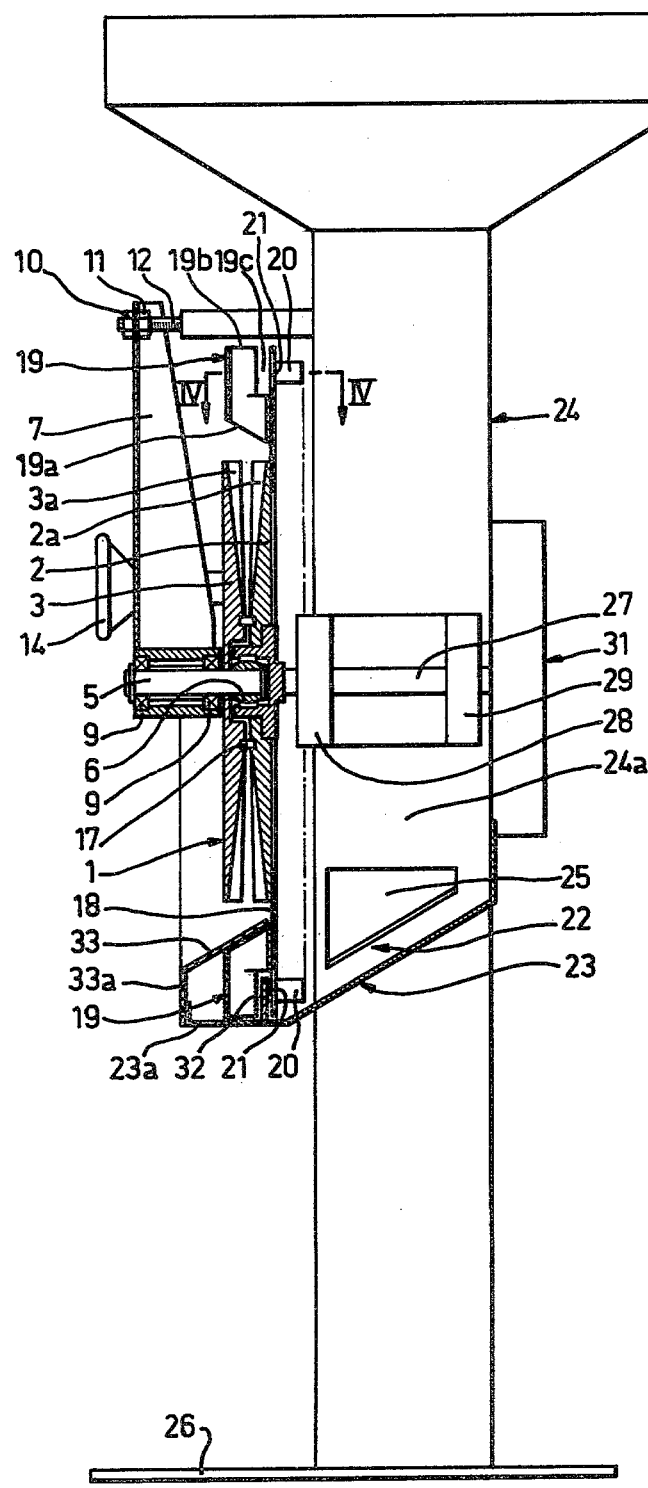
FIG. 2 is a section II—II of the machine shown in FIG. 1.

The peripheral ends of the levers 7 and 8 are fastened to means which make it possible to adjust the inclination of the axis of the second plate with respect to the axis of the first plate. In the example shown, the peripheral end of the lever 7 is engaged between two nuts 10 and 11 mounted on a threaded rod 12 which is fixed and substantially parallel to the axis of the rotor 1, as can be noted from FIG. 2. The peripheral end of the lever 8 is engaged between on the one hand a spring 13 and on the other hand a hand wheel 14 mounted on a threaded rod 15 which is also substantially parallel to the axis of the rotor 1, as can be noted from FIG. 3.

Referring to FIG. 1, the rotor 1 turns in the direction indicated by the arrow 16, that is to say in a direction covering the acute angle between the levers 7 and 8, going from the lever 7 towards the lever 8.

Figure 3:
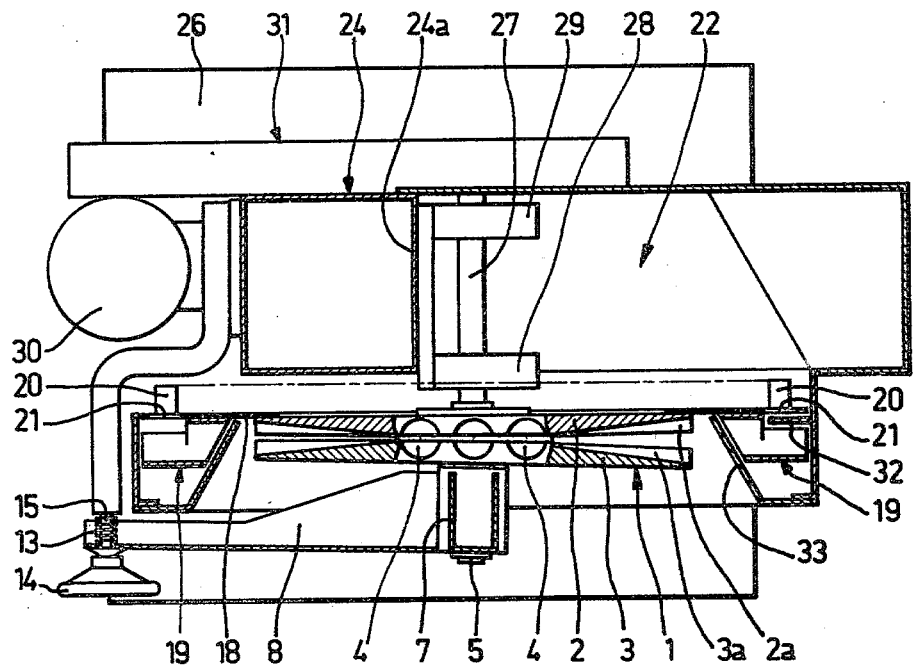
FIG. 3 is a section III—III of the machine shown in FIG. 1.

In the example shown, the adjustment of the levers 7 and 8 is such that when the cavities traverse the plane passing through the axis of the rotor 1 and the lever 7 they have substantially the same cross section, that is to say the distance between the plates 2 and 3 in the said axial plane passing through the lever 7 is the same on each side of the axis of the rotor. Therefore, it is the adjustment of the lever 8 which brings about the decrease and increase of the overall size of each cavity. Referring to FIG. 3, the lever 8 is adjusted in such a manner that the minimum cross section of each cavity is reached when this cavity traverses the plane passing through the axis of the rotor and the lever 8 on the side of the lever 8 the maximum dimensions of each cavity being diametrically opposite.

At the vicinity of the tips of the conical cavities 4, the plates 2 and 3 are connected by an annular joint 17 which makes it possible to open the mechanical connection between the plates 2 and 3.

The machine shown in the figures comprises, furthermore, a feed device which assures the distribution by gravity of one fruit into each cavity 4 of the rotor 1.

This feed device comprises a disk 18 which extends the plate 2 radially towards the outside and is fastened to the latter, for instance by screws, not shown in the figures.

On the side of and facing the cavities the disk 18 bears radial transfer tubes 19 comprising an opening 19a facing the corresponding cavity.

Figure 4:
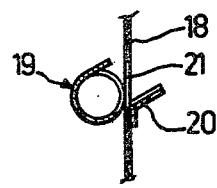
FIG. 4 is a partial section along the line IV—IV of FIG. 2.

The disk 18 on its other face furthermore bears cups 20 each communicating with the inside of the corresponding tube through orifices 21 provided in the disk 18. Referring to FIG. 4, the cups 20 are to the rear of the corresponding orifice in the direction of rotation 16 of the rotor 1 and are inclined towards said orifice.

The cups 20, upon the rotation of the rotor 1, extend into and move out of a store which is generally designated as 22, located adjacent to the lower part of the plate 2 of the rotor 1 and the disk 18, this plate and disk forming a vertical wall for the store 22.

The bottom of the store 22 is formed of a metal plate 23 in the shape of a cone which is open towards the disk 18, said plate 23 being extended by a cylindrically shaped part 23a on the other side of the disk 18. The part 23a of the part 23 is adjacent to the periphery of the disk 18 and blocks the peripheral openings 19b of the tubes 19.

The store 22 is furthermore defined by the wall 24a of a vertical fruit feed stack 24 which is located at a distance from the plate 2 and from the disk 24 so as to permit the passage of the cups 20.

The wall 24a of the feed stack 24 comprises an opening 25 which permits communication between the inside of the stack 24 and the store 22. The inside of the stack 24 is limited towards the bottom by a metal plate, not visible in the figures, which plate is arranged just below the opening 25.

The stack 24 which is extended downward to a horizontal base 26 serves as support for the entire machine. As a matter of fact, the plate 2 is borne by a shaft 27 which is mounted in bearings 28 and 29 fastened to the wall 24a of the stack 24. The drive shaft 27 of the rotor 1 is connected to an electric motor 30 which is also fastened to the stack 24 by a transmission, indicated generally as 31.

The fruit feed device comprises, furthermore, a stationary radial metal plate 32 in the form of a ring sector fastened to the inside of the cylindrical plate 23a. The plate 32 is adjacent the disk 18 on the side of the cups 19, the tubes 19 having a notch 19c for the passage of said plate 32.

The plate 32 covers an arc such that it blocks the orifices 21 of the disk 18 which are present in the store 22 and is extended in the direction of rotation 16 of the rotor 1 up to above the horizontal plane passing through the axis of the rotor 1.

The feed device furthermore comprises a stationary metal plate 33 blocking the openings 19a of the tubes 19. This plate 33 is in the shape of a cone which is open on the side of the plate 3 with respect to the plate 2, the tubes 19 being such that their opening 19a is tangent to the plate 33 and therefore of the same shape.

The plate 33 is extended by a radial part 33a which connects with the cylindrical plate 23a.

As can be seen from FIG. 1, the plate 33 and the plate 33a have a length such that it covers substantially the obtuse angle between the levers 7 and 8.

It will therefore be noted that over a large part of the circumference of the disk, the transfer tubes 19 move within an annular passage defined by the disk 18 and the fixed plates 23a, 33 and 33a.

There will now be described the manner of operation of a machine such as shown in the figures, taking as basis the path which a fruit proceeds along from the stack 24 until the cracking thereof.

The fruits which are introduced into the stack 24 from above pass through the opening 25 and fall into the store 22 in the direction towards its lower part, that is to say towards the cups 20. As the rotor 1 turns in the direction indicated by the arrow 16, each cup 20 penetrates into the store 22 and rises with a fruit which, due to the fact that the cup 20 is inclined towards the orifice 21 of the disk 18, comes against the radial plate 32.

After passing the plate 32, the fruit passes through the disk 18 via the orifice 21, drops by gravity into the transfer tube 19 and comes into contact with the plate 33.

After passing the plate 33, the fruit drops into the corresponding cavity 4.

The rotor 1 continuing to turn, the cross section of the cavity into which the fruit has dropped decreases up to the level of the lever 8 and thus cracks the fruit.

Then, after passing beyond the lever 8, the cross section of the cavity increases and frees the cracked fruit which drops onto the plate 33 and is diverted towards the outside of the machine. The cracked fruit can then be recovered by any means.

The machine in accordance with the present invention as described above has many advantages.

As a matter of fact, the first advantage of the machine such as described resides in the fact that it crushes each fruit by an amount which is a function of its size since the fruit, upon its descent, is stopped in the cavity at a distance from the axis of the rotor which is a function of its size due to the conicity of the cavity, which conicity can be previously selected. For a given adjustment of the levers 7 and 8, the crushing of the fruit will therefore be a function of its distance from the axis of the rotor. This feature of the present machine is very important since measurements made on hundreds of fruits and in particular on nuts show that the crushing necessary for the cracking of their shell is substantially proportional to their size.

Moreover, for one and the same rotor 1, the crushing of the fruit can be varied by modifying the adjustment of the lever 8. However, one can also modify the value of the angle during which the fruit is crushed by acting on the lever 7 and on the lever 8 thus causing an angular displacement of the place where the overall size of the cavities 4 is minimum.

Furthermore, by changing the rotor, one can on the one hand, increase the output of the machine by increasing the number of cavities and on the other hand adapt the size of the cavities to the fruits which it is desired to crack.

The present invention is not limited to the example which has been described above. Rather, many variants are possible.

For example, cavities of a different shape can be provided. Moreover, other means of connection between the levers and the plates can be used. One could also change the levers and replace them by some other means which makes it possible to modify the inclination of the plate 3 with respect to the plate 2.

I claim:

1. A machine for cracking shell fruit comprising:

a first substantially circular plate rotating about a first axis and having on one of its faces a plurality of radial grooves extending from the periphery of said first plate with decreasing dimensions towards the center of said first plate;

a second substantially circular plate rotating about a second axis and having on one of its faces a plurality of radial grooves extending from the periphery of the second plate with decreasing dimensions towards the center of said second plate;

said first and second circular plates being mounted at a distance from each other with their respective radial grooves facing each other and rotated at substantially the same speed so that the respective pairs of radial grooves are maintained in a facing relationship and defining a cracking cavity of substantially conical shape open at the periphery of said rotation for receiving a single shell fruit introduced in said cavity;

said second axis cutting said first axis substantially within the interval separating said first and second plates whereby during said rotation movement of both plates at essentially the same speed the overall size of the cross-section of each cavity decreases and increases as a result of relative motion between said facing grooves during rotation of said plates wherein fruit introduced into said cavity are crushed and thence released; and a fruit-feed device for introducing one single fruit into each individual cavity during rotation movement of both plates at a position where said individual cavity has not yet reached its minimum overall size.

2. A machine for cracking shell fruit comprising:

a first substantially circular plate rotating about a first axis and having on one of its faces a plurality of radial grooves extending from the periphery of said first plate with decreasing dimensions towards the center of said first plate;

a second substantially circular plate rotating about a second axis and having on one of its faces a plurality of radial grooves extending from the periphery of the second plate with decreasing dimensions towards the center of said second plate;

said first and second circular plates being mounted at a distance from each other with their respective radial grooves facing each other and rotated at substantially the same speed so that the respective pairs of radial grooves are maintained in a facing relationship and defining a cracking cavity of substantially conical shape open at the periphery of said rotation for receiving a single shell fruit introduced in said cavity;

said second axis cutting said first axis substantially within the interval separating said first and second plates whereby during said rotation movement of both plates at essentially the same speed the overall size of the cross-section of each cavity decreases and increases as a result of relative motion between said facing grooves during rotation of said plates wherein fruit introduced into said cavity are crushed and thence released;

a fruit-feed device for introducing one single fruit into each individual cavity during rotation movement of both plates at a position where said individual cavity has not yet reached its minimum overall size, wherein the feed device comprises a disk which radially extends the first plate towards the outside;

said disk bearing on the same side as and facing the cavities radial transfer tubes having an inner opening substantially facing the corresponding cavity and, on the other side, cups each of which communicates with the inside of the corresponding tube by orifices which pass through the disk; the cups moving into a store of fruit defined in part by the disk on the first plate; a fixed radial metal plate preferably in the form of a ring sector which is adjacent to the disk transfer tubes blocking the orifices of the disk which are present in said store and extending up to at least the horizontal plane passing through the axis of the rotor, in the direction of rotation of the latter; another stationary metal plate blocking said interior openings of the tubes at least over a portion of the periphery of the disk extending from the place where said radial plate stops up to the vicinity of the upper part of the disk, in a direction of rotation of the latter, whereby fruit is raised by said cup and is forced through said orifices against said radial plate until said fruit is above said radial plate entering said transfer tubes before entering said cavities.

3. A machine according to claim 2, wherein said plate which blocks the inner openings of the tubes is extended in the opposite direction of rotation to block at least the tubes present below the horizontal plane passing through the axis of the rotor.

4. A machine according to claim 2, wherein said plate which blocks the inner openings of the tubes has the shape of a cone open on the side of said second plate with respect to the first plate, and said inner openings having a corresponding shape.

5. A machine according to claim 4, wherein the cups are inclined in the direction towards the orifice of the disk.

6. A machine according to claims 1 or 2, wherein the axis of the first plate is fixed and the inclination of the axis of the second plate with respect to the axis of the first plate is adjustable in order to modify the amount of increase and decrease of the overall size of the cavities.

7. A machine according to either of claims 1 or 2 wherein the second plate is connected to two radial levers which are spaced apart at an angle from each other with preferably fixed angular position, one of the ends of said levers being connected to the second plate by means permitting the second plate to turn while maintaining the position of the levers stationary with respect to the general plane of the second plate, and their other ends being fastened to means which make it possible to regulate the inclination of the axis of the second plate with respect to the axis of the first plate by displacement of their other ends.

8. A machine according to claim 7, wherein the second plate is mounted on a shaft which is connected to the first plate by a swivel joint whose center is substantially on the axis of the first plate, said levers being connected to said shaft by bearing means.

9. A machine according to claim 1, wherein said cavities are substantially of cone shape.

10. A machine according to claim 1, wherein in the vicinity of the tips of the said cavities the plates are connected axially by an annular joint.

11. A machine according to claim 8, wherein the peripheral openings of the tubes are blocked by a stationary plate covering the same arc as said plate which blocks said inner openings of the tubes.

* * * * *